US006352092B1

(12) United States Patent
Sergel et al.

(10) Patent No.: US 6,352,092 B1
(45) Date of Patent: Mar. 5, 2002

(54) VEHICLE WHEEL WITH A TUBELESS PNEUMATIC TIRE AND A ONE-PIECE RIM HAVING AN EMERGENCY ROLLING SURFACE AND A PROCESS FOR MOUNTING THE TIRE ON THE RIM

(75) Inventors: Horst Sergel, Hannover; Frank Walloch, Peine; Heinrich Huinink, Garbsen, all of (DE)

(73) Assignee: Continental Aktiengesellschaft, Hannover (DE)

( * ) Notice: Subject to any disclaimer, the term of this patent is extended or adjusted under 35 U.S.C. 154(b) by 0 days.

(21) Appl. No.: 09/055,184

(22) Filed: Apr. 6, 1998

(30) Foreign Application Priority Data

Mar. 17, 1998 (DE) .......................................... 198 11 541

(51) Int. Cl.$^7$ ...................... B60B 21/02; B60B 21/12; B60C 3/00; B60C 15/02; B60C 15/04; B60C 17/00; B60C 17/04
(52) U.S. Cl. .................. 152/516; 152/520; 152/540; 152/544; 152/380; 152/DIG. 20; 29/894.31
(58) Field of Search ........................... 152/379.4, 381.4, 152/380, DIG. 20, 544, 516, 540, 539, 520, 158; 29/894.31

(56) References Cited

U.S. PATENT DOCUMENTS 875,053 A * 12/1907 Duryea ............ 152/DIG. 20 X 1,932,191 A   10/1933 Shoemaker
4,630,662 A * 12/1986 Howind .................. 152/380 X

FOREIGN PATENT DOCUMENTS

| DE | 2364274  | 6/1975 |
| DE | 3000428  | 7/1981 |
| DE | 3336239  | 4/1985 |
| DE | 3605803  | 1/1987 |
| DE | 19530939 | 9/1996 |

* cited by examiner

Primary Examiner—Adrienne C. Johnstone
(74) Attorney, Agent, or Firm—Greenblum & Bernstein, P.L.C.

(57) ABSTRACT

A vehicle wheel with a one-piece rim and tubeless pneumatic tire comprises an emergency rolling surface on a radially exterior shell of the rim, an elastic bead, and a one-piece toroidal chamber at each axial front end of the rim. Each chamber includes a closed radially interior chamber wall, a closed radially exterior chamber wall, a closed axially interior chamber wall, and an axially exterior chamber wall axially closed in a radially exterior area defining a radially inwardly directed flange and open in a radially interior area. A filler ring is radially secured in each chamber on the radially interior chamber wall. Each side wall of the tire extends inwardly from the axially exterior wall through the opening, and the head is embedded in the chamber such that the bead lies across the axial extent of the filler ring, the head and the filler ring completely filling the chamber.

22 Claims, 12 Drawing Sheets

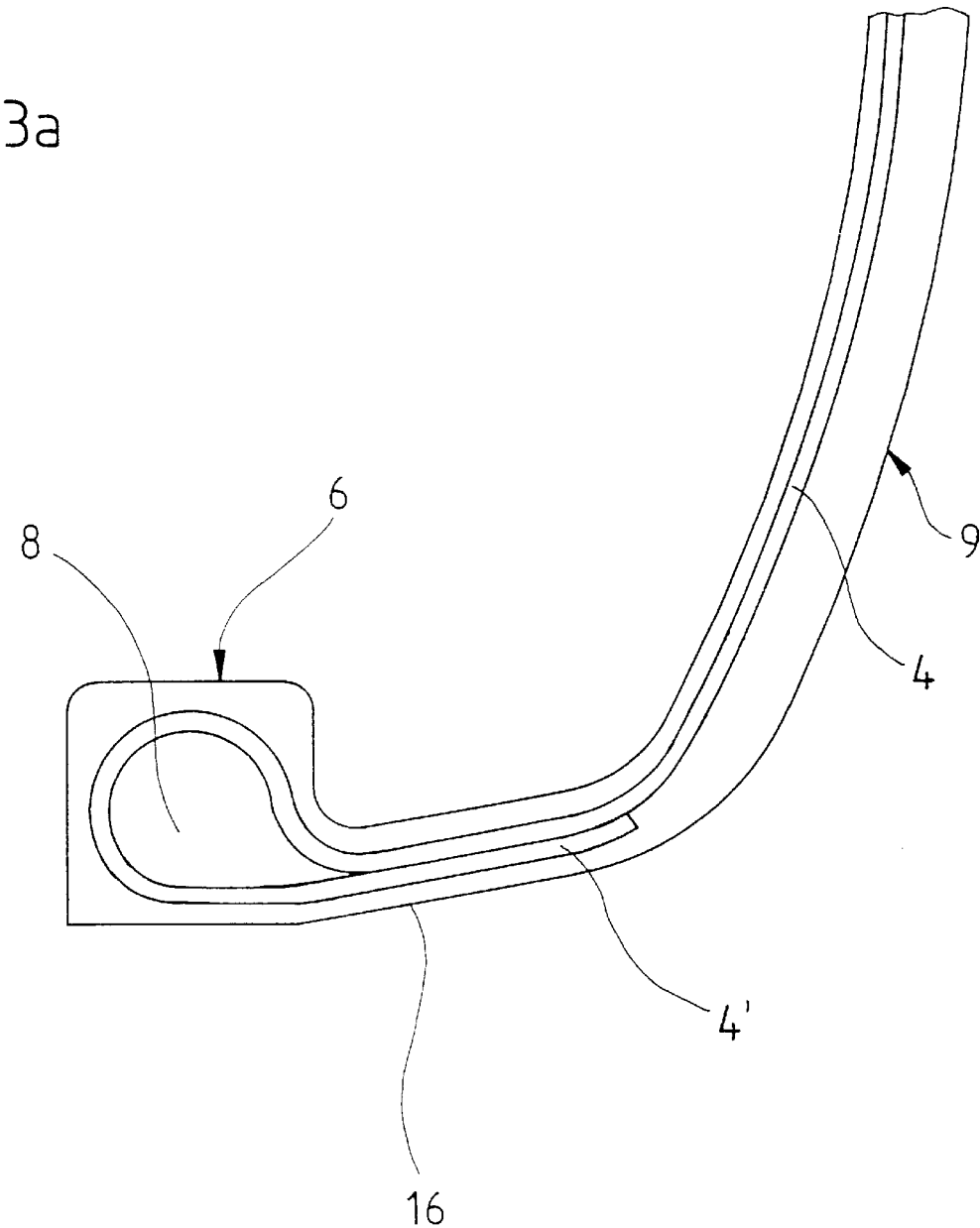

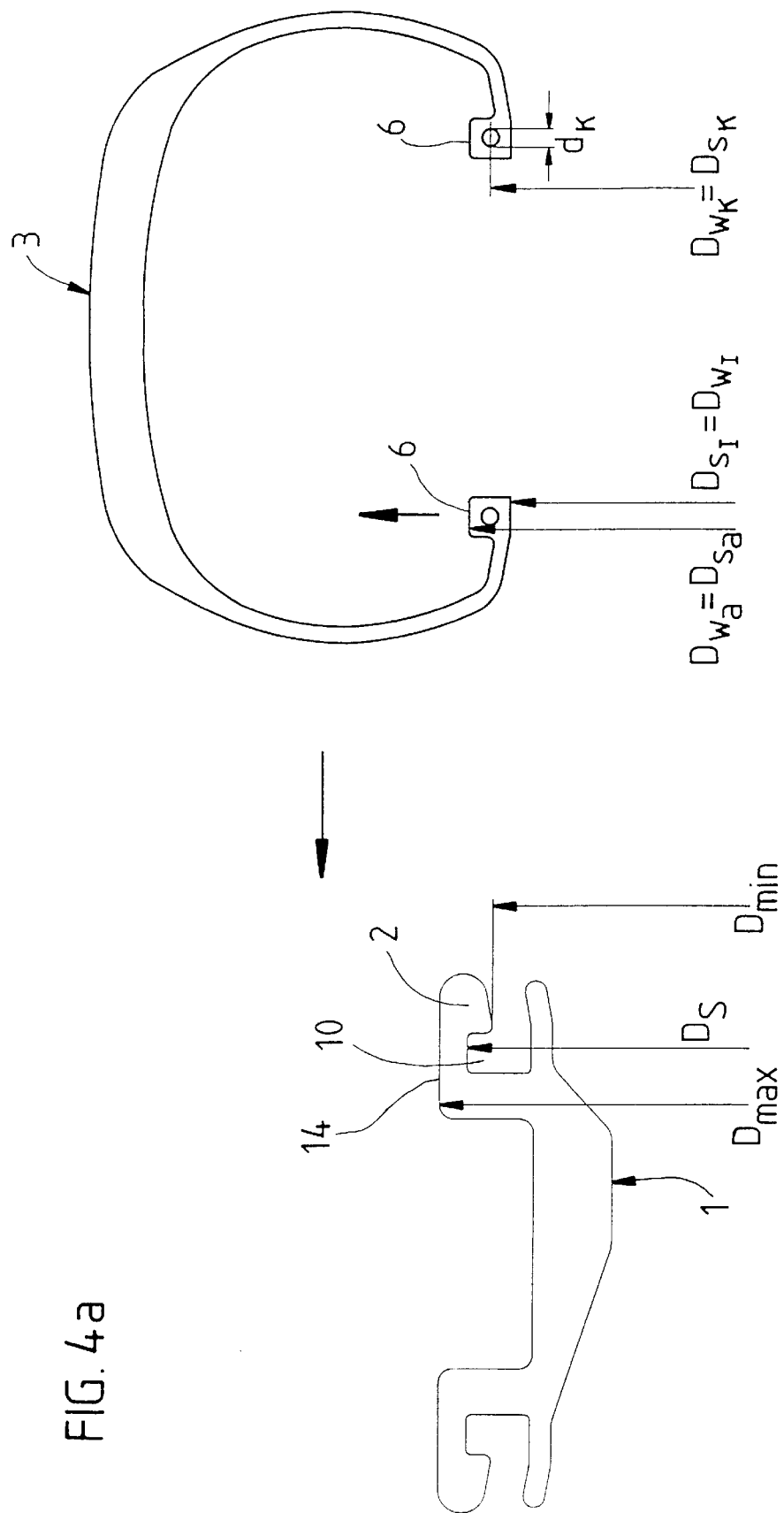

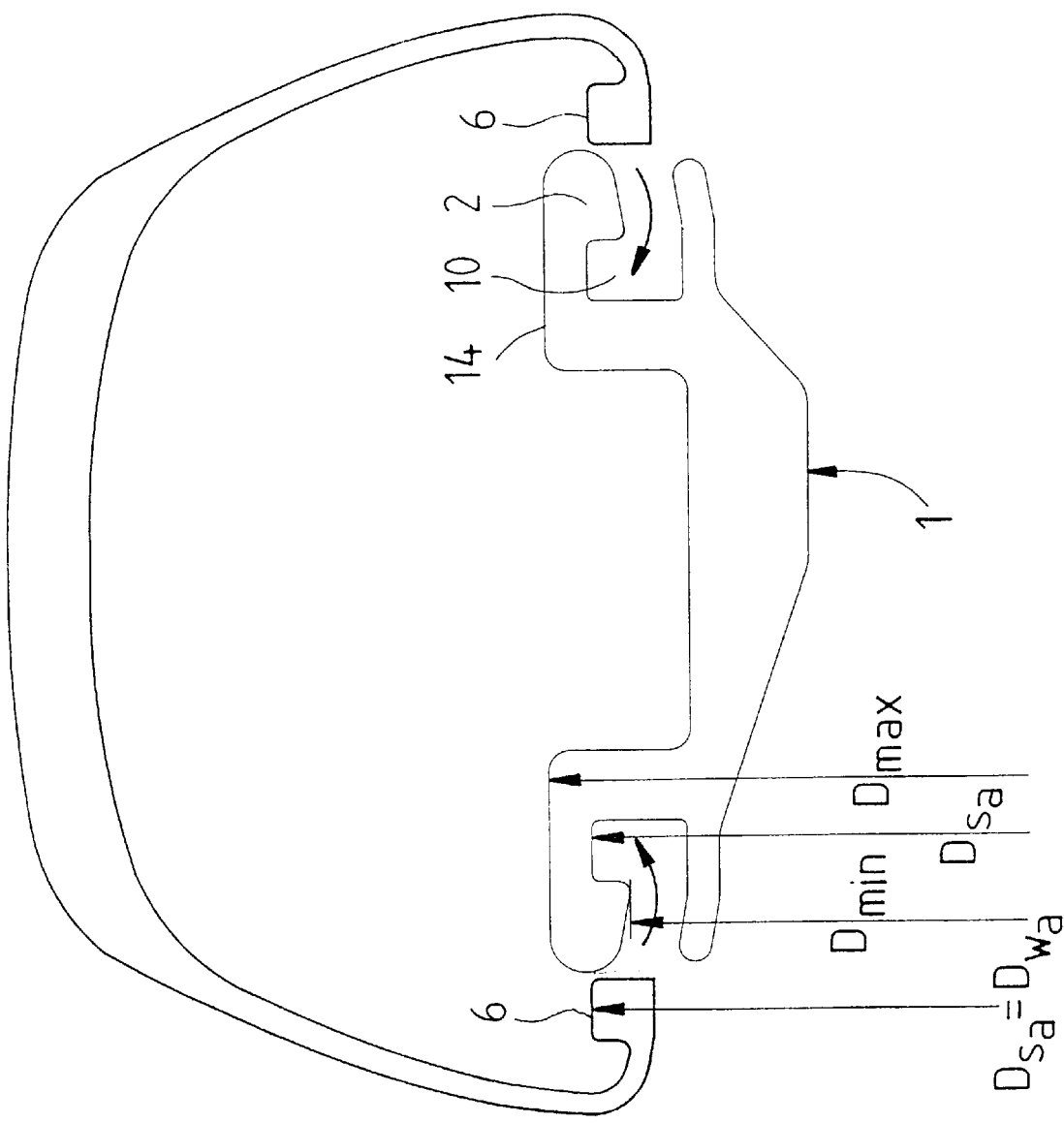

VEHICLE WHEEL WITH A TUBELESS PNEUMATIC TIRE AND A ONE-PIECE RIM HAVING AN EMERGENCY ROLLING SURFACE AND A PROCESS FOR MOUNTING THE TIRE ON THE RIM

BACKGROUND OF THE INVENTION

1. Field of the Invention

The invention relates to a vehicle wheel with a one piece rim and a tubeless pneumatic tire, which is suitable for use in an emergency roll, as well as a process for mounting a pneumatic tire on a rim with an emergency rolling surface.

2. Discussion of Background Information

Tubeless vehicle pneumatic tires of a modern design are generally designed with beads on their radially interior ends of their side-walls. A carcass of radial fabrication, designed with stress supports coated in rubber extends from tire bead to tire bead. In each tire bead there is a ring-shaped, tensile, and rigid bead core made of steel—which is disposed concentrically to the tire axis—in which the carcass is stayed. During the mounting of the vehicle pneumatic tire on the rim, the vehicle pneumatic tire is affixed with its bead on the radially exterior shell of the rim. The high tensile strength and rigidity of the bead, which is effected by the tensile strength and rigidity of the bead core, secures the scaling in the rim-tire connection desired in tubeless tires and secures the scaled seating of the tire on the rim in the inflated condition of the tire. The rigid, tensile design of the bead core hinders—even during demanding driving maneuvers—an axial stripping-off of the vehicle wheel from the rim over the wheel flange, which is oriented radially outward.

For mounting or dismounting of the vehicle pneumatic tire, the tensile, rigid bead of a one-piece rim must be moved with its inner diameter over the larger outer diameter (as opposed to the inner diameter of the rigid bead) of the wheel flange. To make this possible, additional expenditure, for example, the manufacture of the rim with a drop base, is required.

If a loss of air pressure occurs, the tire side-wall buckles. It can thereby be pressed on the wheel flange, which is designed for the axial securing of the vehicle pneumatic tire on the rim. If the vehicle continues to be driven, the tire side wall and the wheel flange can be destroyed. The vehicle pneumatic tire can break away from the rim.

In an attempt to prevent the foregoing situation and to make possible a safe, continued journey, despite a loss of air pressure, it was recommended that the rim be designed with additional emergency rolling surfaces that project radially over the wheel flange on the radially exterior side of the one-piece rim, upon which the vehicle pneumatic tire supports itself with its radially inner side of its rolling surface area in the event of a loss of air pressure and which thus guarantees emergency rolling characteristics after a loss of air pressure. The mounting and dismounting of vehicle pneumatic tires on such rims prove difficult, since the tensile, rigid beads must be displaced over the even larger outer diameter of the emergency rolling surfaces, and since the emergency rolling surfaces additionally restrict the axial space between the bead seat areas on the rims which are to be used as a mounting aid, for example, the fabrication of a drop base. To be able to mount the rigid, tensile bead, the practical ratio between the outer diameter of the emergency rolling surface to the inner diameter of the tensile, rigid bead is very limited. The outer diameter of the emergency rolling surface may only be so great that the rigid bead can still be moved over it. As a result, the emergency rolling surfaces are determined in large part by a comparatively small inner diameter of the rigid bead and, thus, by a parameter which is insignificant for the emergency rolling characteristics. Vehicle pneumatic tires can no longer be mounted when the outer diameter of the emergency rolling surfaces of the rims exceeds that which is suited for optimal emergency rolling characteristics.

It is known from CTS (Continental Tire System) tires to support tubeless vehicle pneumatic tires with their beads on support surfaces on the radially inner side of the one-piece CTS rim designed with emergency rolling surfaces on its radially external side. In each tire bead there is a ring-shaped, pressure-rigid, and tensile bead core made of steel—disposed concentrically to the tire axis—,in which the carcass is stayed. With the mounting of the vehicle pneumatic tire on the rim, the CTS vehicle pneumatic tire is affixed with its bead on the radially interior shell of the rim. The high tensile strength and pressure rigidity of the bead, which is effected by the tensile strength and pressure rigidness of the bead core, secures the sealing in the rim-tire connection that is desired with tubeless tires and secures the sealed seating of the tire on the rim in the inflated condition of the tire. The pressure-rigid, tensile fabrication of the bead core hinders—even during demanding driving maneuvers—an axial stripping-off of the vehicle wheel from the rim over the wheel flange, which is oriented radially inward on the radially inner side of the rim. Such a tire is known, for example, from DE-30 00 428 C2.

Since the rim seating and the wheel flange are designed on the radially inner side of the rim, a CTS tire provides a greater axial extension area for the formation of emergency rolling surfaces on the radially exterior shell of the rim than is the case with the tire-wheel system that is conventionally affixed on the radially exterior shell of a rim. On the radially exterior side of the CTS rim, the wheel flange no longer constitutes a wheel flange element which interferes with the emergency rolling.

To mount or dismount the CTS vehicle pneumatic tire, the tensile, pressure-rigid bead must be moved with its inner diameter on the radially exterior shell of the rim over the larger outer diameter (as opposed to the inner diameter of the rigid bead) of the emergency rolling surfaces and on the radially inner shell of the rim over the smaller inner diameter (as opposed to the inner diameter of the rigid core). To make this possible, additional expenditure is necessary, for example, the designing of the rim with an elevated base on the radial inner shell, as well as expensive, special mounting techniques.

The mounting and dismounting of the vehicle pneumatic tires on such rims thus also proves difficult, since the tensile, pressure-rigid CTS beads must be moved over the even larger outer diameter of the emergency rolling surfaces on the radial outer side of the rim and over the smaller inner diameter (as opposed to the inner diameter of the rigid bead) on the radial inner shell of the rim. So that the mounting of the pressure-rigid, tensile bead is even possible, the practical ratio between the outer diameter of the emergency rolling surface to the inner diameter of the tensile, pressure-rigid bead is still limited, even with CTS tires. The outer diameter of the emergency rolling surface can only be of such size that the rigid bead can still be moved over it. As a result, the emergency rolling surfaces are still determined in large part by a comparatively small diameter of the rigid bead and, thus, by a parameter which is insignificant for the emergency rolling characteristics, even with CTS tires. Vehicle pneumatic tires with their rigid beads can no longer be mounted when the outer diameter of the emergency rolling surfaces of the rim exceeds that which is suited for optimal emergency rolling characteristics.

A vehicle wheel with a one-piece rim and a tubeless, beadless pneumatic tire is known from DE 19530939 C1, in which the radially exterior shell of the rim is designed with emergency rolling surfaces. The beadless vehicle pneumatic tire is scorched on the radially interior shell of the rim. The bead-free design of the vehicle pneumatic tire makes possible the manufacturing of emergency rolling surfaces which are independent of bead diameters. For the fabrication of the emergency rolling surfaces, parameters which are important for an emergency rolling can be better taken into consideration with such a vehicle pneumatic tire, so that desired, greater diameters of the emergency rolling surfaces for the optimization of emergency rolling can be realized with ease. However, such vehicle pneumatic tires cannot be readily dismounted or exchanged without destruction.

It was recommended in DE-OS 2364274 to fasten radially a vehicle pneumatic tire with its beads between two radially spaced rim components of a multi-component rim. The bead core can elongate, so that the bead can be better mounted over the wheel flange, which is constructed on the radially exterior rim component and which is oriented radially inward, and so that, with the inner pressure of the tire, it can expand during elongation along the conical support face of the radially inner rim component. DE-OS-2364274 is not concerned with emergency rolling. The bead has great axial play between the rim components. Especially in the event of air pressure loss, the possibility cannot be excluded that the bead peels off axially and even slips out axially between the rim components. Safer emergency rolling characteristics are not guaranteed with a design of that kind.

It is known from U.S. Pat. No. 1,932,191 to fix laterally in a rim a flexible bead of a vehicle pneumatic tire with the aid of a flexible, non-metallic clamping ring constructed between the rim and bead in a circumferential groove. The flexible bead is reinforced with a core made of cloth or cords. The bead is indeed flexible, but because of the rigidity it is designed with an invariable circumferential length in the circumferential direction. The bead can thus be warped [bent] for mounting. Emergency rolling or emergency rolling problems are not known from U.S. Pat. No. 1,932,191.

SUMMARY OF THE INVENTION

The basis of the present invention is to create a vehicle wheel with a one piece rim and a tubeless pneumatic tire, which is suitable for emergency rolling, as well as a process for mounting a pneumatic tire on a rim with an emergency rolling surface, in which—in an operationally secure manner—the advantages of the CTS wheel-tire-system (with respect to their ability to be mounted and dismounted without being destroyed) can be added with the advantages of the bead-free, scorched wheel-tire-system with the possibility of increased optimization of the emergency rolling surfaces.

According to the present invention, a vehicle wheel is fabricated that includes an emergency rolling surface designed on the radially exterior shell of a rim, and an elastic bead to fasten the pneumatic tire on the wheel rim. The bead is enlarged on each side wall of the pneumatic tire to the inner side of the pneumatic tire and is alterable in its circumferential length. The vehicle wheel also includes a toroidal chamber, which is constructed in at least one piece in an axial front-end of the wheel rim with toroidal chamber walls, in which one which is radially interior, one which is radially exterior, one which is axially inward to the middle of the wheel rim, and one which is axially exterior to the exterior of the wheel rim. In this manner, the toroidal chamber walls which are radially inward, which are radially outward, and which are constructed axially inward to the center of the wheel rim are closed and the toroidal chamber wall, which is constructed axially outward to the front-end of the rim, is constructed closed in the radially exterior area as a wheel flange which is directed radially inward and is constructed open in its radial interior area. A filler ring is embedded in a radially secure manner inside the toroidal chamber on the radially interior toroidal chamber wall. The side wall of the tire extends inward from the axial exterior through the opening in the toroidal chamber wall constructed axially exterior and the bead is embedded in the toroidal chamber on the radial outside of the filler ring and is constructed in form-closure contact with the radially exterior, to the axially interior, and to the axially exterior closed toroidal chamber wall, so that the bead is connected to the toroidal chamber which is constructed in a single piece, to the radial exterior, to the axial exterior, to the axial interior, and to the form closure via the filler ring toward the radial interior. The bead lies completely on the filler ring especially over its entire axial extent to the radial interior and whereby especially the bead and the filler ring completely fill the toroidal chamber. Further, the invention includes a process for mounting a pneumatic tire on a wheel rim with an emergency rolling surface with a toroidal chamber, which is formed on both sides of the wheel rim in the single-piece, axial front-end of the rim. The toroidal chamber is closed radially inward, radially outward, and axially inward to the center of the wheel rim and is constructed partially open to the front-end, to embed the bead and a filler ring radially inside the bead, for fastening the pneumatic tire to the wheel rim via axial introduction through the opening. In this manner, the opening in the front-end is closed in its radially exterior area from the radial exterior by the wheel flange, which is oriented radially inward and which is formed in a single piece by the chamber walls. In this way, the tire is introduced with its bead into the toroidal chamber, which is constructed for embedding the bead and the tire then is brought with a filler ring, which is axially displaceable on the wheel rim by axial movement of the filler ring radially between a bearing surface in the toroidal chamber of the wheel rim and the bead in an axial and radial form closure to the radial exterior and axial interior to the chamber walls, to the axial exterior to the wheel flange of the toroidal chamber and to the radial interior to the filler ring and thus fastened in the toroidal chamber.

The bead core, which can be elastically altered in its circumferential length, enables the mounting of the bead by movement over the emergency rolling surface with a larger bead core diameter than in the fixed operating state of the bead and for movement over the wheel flange with a smaller bead core diameter than in a fixed operating condition, so that the design of the emergency rolling surfaces no longer need be designed in dependence upon the diameter of the bead core in operating condition and from the inner wheel flange diameter, but primarily that optimal emergency rolling characteristics can be designed accordingly. After the introduction of the bead into the toroidal chamber, the filler ring is introduced radially within the bead, axially into the toroidal chamber, so that between the radially inner toroidal chamber wall and the filler ring, between filler ring and bead, and between the bead and radially exterior toroidal chamber wall, a radial form closure is produced. Further, between the axially inner toroidal chamber wall and the bead, and between the bead and the wheel flange that forms the axially exterior toroidal chamber wall produces, an axial form closure is provided. After a loss of air pressure during vehicle wheel operation—during normal operations as well as emergency rolling operations—a complete form closure exists axially outward and inward and radially outward and inward between a one-piece toroidal chamber of the rim and bead. Both the forces affecting the bead radially and those affecting the bead axially are thus introduced directly into the one-piece rim in the fastening area. Even during an emergency rolling operation, no significant axial forces are introduced into the only additional element, the filler ring. In this manner the bead can safely and dependably retain its position in the toroidal chamber, even during an emergency rolling operation. The bead which can be altered in its circumferential length can thus be mounted and dismounted in an easy and operationally secure manner, whereby the emergency rolling surfaces can be optimized for the emergency rolling, as can the wheel flange with respect to the axial support for the bead, as can the bead core in its operational condition with respect to its characteristics in operational condition. The force introduction into the rim is particularly secure if the bead lies completely on the filler ring over its entire axial extension radially inward. If the bead and the filler ring fill up the toroidal chamber completely, then a particularly reliable form closure between the bead and the rim is attained. By forming the vehicle pneumatic tire with elastically alterable circumferential lengths of the bead, it is particularly easy and safe to attain an alteration of circumferential length from a first circumferential length to further circumferential lengths—which are individually adjusted in accordance with current demand—opposing the effect of restoring forces and back again in the first circumferential length by utilizing the restoring forces.

A design for attaining especially good emergency rolling characteristics is preferred, since the tread can be sufficiently supported despite the optimal spacing width of the particularly crucial shoulder regions between the tire beads of the vehicle pneumatic tire. It is particularly advantageous to design an emergency rolling surface on each of the axial side regions of the radially exterior shell of the rim, to support the shoulder regions, which are especially crucial in the event of an emergency rolling situation.

A design of the vehicle wheel is particularly advantageous in which the bead core is designed as a rubber core, integrated in the bead. The rubber core is simple to manufacture and can be stayed especially easily and reliably in the bead. The bead can hereby be designed in a simple, reliable way to be elastically expandable in its circumferential length. For a particularly secure fit, the rubber core is designed with a Shore A hardness in the range of 80 to 100—preferably in the range between 85 and 90.

In another embodiment of the vehicle wheel, the bead is designed completely coreless. The bead is especially simple to make, without additional expense for a core, can be modeled sufficiently elastically expandable in its circumferential length via its coreless rubber material, and can nevertheless be stayed securely and reliably by the form closure in the toroidal chamber.

Another embodiment enables a particularly simple and reliable mounting and dismounting of the vehicle pneumatic tire on the rim. After the bead has been introduced into its anchoring position in the toroidal chamber, it is displaced by a simple axial displacement of the filler ring on the bearing surface—designed for this purpose—of the toroidal chamber, into its filler position in the toroidal chamber, through which the entire form closure of the bead in the toroidal chamber is manufactured and secured. By simple, axial extraction of the filler ring from its position, the form closure is raised [neutralized, counteracted], so that the bead can be removed from the toroidal chamber and the vehicle pneumatic tire can be dismounted from the rim.

Through a further embodiment, an additional radial form closure can be attained between the side wall area, which connects directly to the bead, and wheel flange and between the side wall area, which connects directly to the bead, and the filler ring; and, thus, to the flange, at least in the penetration area through the opening. The staying of the bead in the rim hereby becomes more secure. Furthermore, the access to the filler ring from outside is thus simplified, so that mounting and dismounting, are simplified.

Through the conically expanded design of the radially exterior shell of the filler ring in its expansion outside the toroidal chamber, the tire side wall in the wheel flange area is additionally secured, and the progression of the lower tire side wall in the area adjoining in an axially exterior manner to the wheel flange is fixed with a directional component which is directed radially outwards. In this way, the form closure is additionally secured between the tire bead and the wheel rim. It is especially advantageous if the filler ring lends the tire side wall additional rigidity in the directly adjoining area on the wheel flange. In order to provide this, it is advantageous—in direct connection to the wheel flange axially exterior to the wheel flange—to design the radially exterior contour of the filler ring with a curve profile corresponding with the tire side wall contour in this area. It is preferred that the vehicle wheel be designed such that the axially exterior front end is designed as an axial support surface for the axial support of the lower tire side wall. In this manner, the tire is supported axially in the lower side-wall region to attain good handling characteristics while taking a curve and, in the event of unusual impact loads, can provide good comfort characteristics all the way to the lower side-wall region through spring deflection by neutralizing the axial support effect.

The fixing of the tire is particularly secure when the pneumatic tire is supported in the interior by the wheel rim and outside by the filler ring.

The embodiment is particularly advantageous, due to its simple fabrication, mounting, and dismounting. Furthermore, an introduction of axial forces from the bead into the filler ring is reliably prevented via the cylindrical embodiment of the radially exterior shell of the filler ring, so that the staying of the bead is even more reliable.

The design of a vehicle wheel—in which the largest outer diameter of the emergency rolling surfaces is a factor of between 1.05 and 1.3 greater than the inner ring diameter of the bead core in the mounted condition of the vehicle wheel—allows optimal emergency rolling characteristics through the especially large outer diameter of the emergency rolling surface while retaining the optimal, small inner ring, diameter of the bead core for attaining good spring deflection of the tire and, thus, good comfort characteristics. The design of a vehicle wheel—in which the largest outer diameter of the emergency rolling surfaces amounts to a factor of between 1.1 and 1.2 greater than the inner ring, diameter of the bead core in the mounted condition of the vehicle wheel—represents an optimal design range of the standard tire dimensions for solving the conflicting goals of good emergency rolling characteristics on the one hand, and comfort and weight of the vehicle wheel on the other hand.

The design of a vehicle wheel, in which the bead core exhibits an expansibility and/or contractibility of 5% to 30%, enables a simple and reliable mounting, despite optimal emergency rolling characteristics through the formation of a particularly large outer diameter of the emergency support surfaces, despite retaining the design to attain good spring deflection of the tire and, thus, good comfort characteristics through an optimally small inner ring diameter of the bead core. Via simple—in particular elastic—expansion and/or contraction of the bead, the bead is adjusted, respectively, to the optimal diameter which is necessary for mounting or dismounting over the emergency support surfaces; to the required, optimal diameter for mounting or dismounting over the wheel flange that is oriented inward; and to the required, optimal diameter for the secure seating in the toroidal chamber. The design of a vehicle wheel, in which the bead core exhibits an expansibility and/or contractibility from 10% to 20%, enables a simple and reliable mounting, in the optimal manufacturing range of the standard tire dimensions for solving the conflicting goals of the emergency rolling characteristics on the one hand, and the comfort and weight of the vehicle wheel on the other hand.

The embodiment in which the bead core exhibits an expansibility of 5% to 30% and a contractibility of 1% to 5%, and in which the bead core is not expanded and not contracted, particularly in the mounted condition of the vehicle wheel. By simple—in particular elastic—expansion expansion from the condition in which it is not expanded and not contracted, the bead core is brought to the optimal, large diameter over the emergency support surface for mounting or dismounting. By simple—in particular elastic— contraction from the unexpanded and uncontracted state, the bead core is brought to the optimal, small diameter over the wheel flange, which is oriented inward, for mounting or dismounting. The embodiment of a vehicle wheel, in which the bead core exhibits an expansibility of 10% to 20% and a contractibility of 2.5% to 3.5% enables a simple and reliable mounting in an optimal manufacturing range of the standard tire dimensions for solving the conflicting goals of good emergency rolling characteristics on the one hand, and comfort and weight of the vehicle wheel on the other hand. It is particularly advantageous if the bead core—in the mounted state of the vehicle wheel—is not expanded and not contracted, and, thus, is generally free of inner forces exerting influence in the circumferential direction. Particularly advantageous is the elastically expandable and elastically contractible design. The bead core is expanded in the circumferential direction from the unexpanded and uncontracted condition for mounting over the emergency support surfaces in opposition to the elastic restoring forces. After the mounting over the emergency support surfaces, it is reduced again in its circumferential length by the restoring forces until it reaches the condition in which it is not expanded and not contracted. To mount over the wheel flange oriented inward, the bead core is contracted in the circumferential direction from the condition in which it is not expanded and not contracted, in opposition to the elastic restoring forces. After the mounting over the wheel flange, it is then again increased in size in its circumferential length in the toroidal chamber by the restoring forces back to its unexpanded and uncontracted state. The dismounting ensues in a corresponding manner.

Another embodiment makes possible a reliable, easily manageable embodiment of a filler ring. The rubber-coated stress supports—of the multifilament or monofilament variation—, which are generally oriented in the circumferential direction and are constructed of steel or cloth, guarantee a secure, reliable retention of the seating of the filler ring on the bearing surface in the toroidal chamber and guarantee sufficient elasticity for axial mounting and dismounting. Particularly easy to manufacture is the embodiment of the filler ring from a continuous stress support which is helically spooled on the axis of the filler ring.

BRIEF DESCRIPTION OF THE DRAWINGS

The description is described in more detail with the aid of the embodiments depicted in the FIGS. 1 through 4. Shown are:

FIG. 3a shows a bead core embedded in a tire carcass;

FIG. 4a–4f show yet another feature of mounting the tire on the rim.

DETAILED DESCRIPTION OF THE INVENTION

Figure 1:
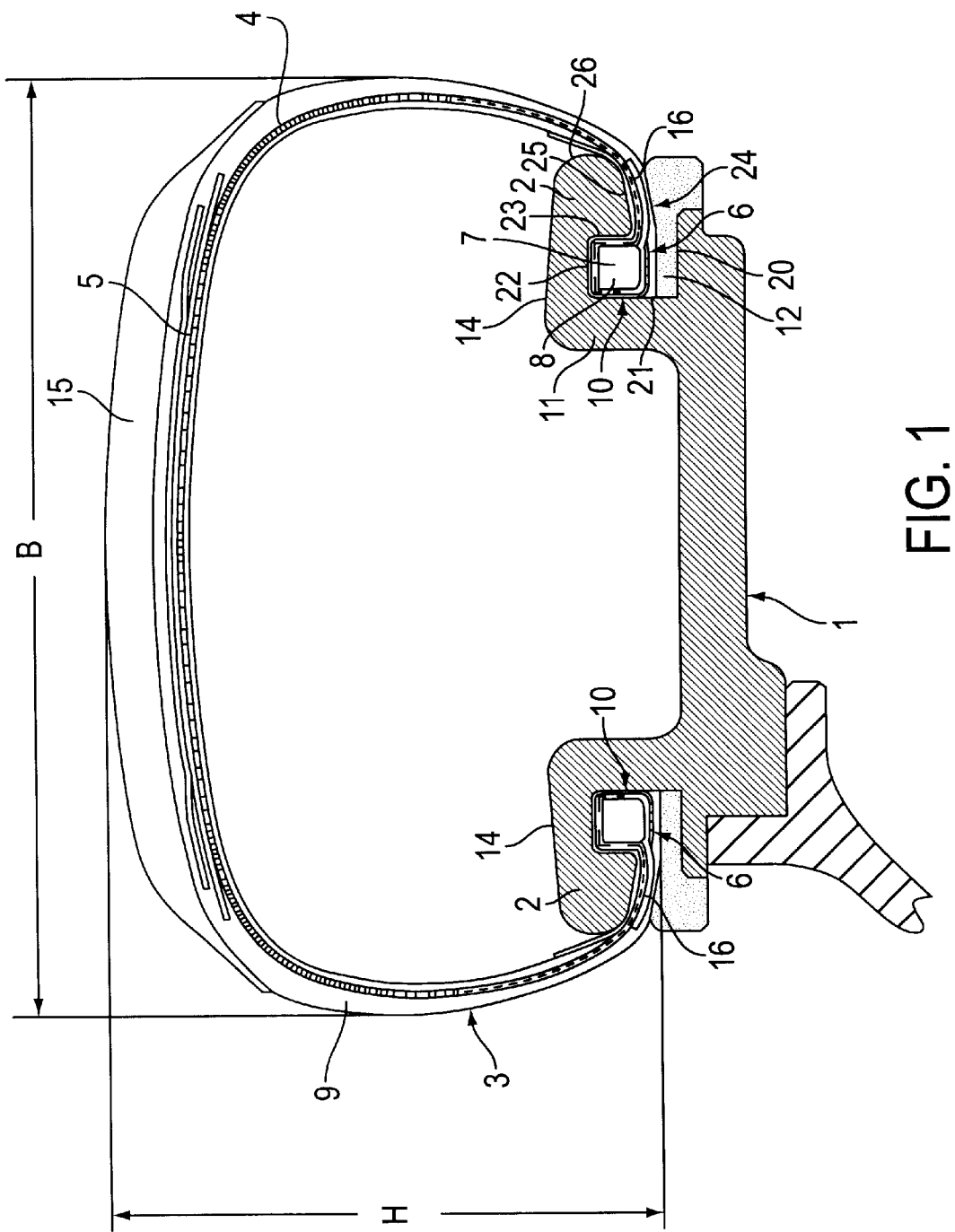
FIG. 1 a cross-sectional depiction of a vehicle wheel in accordance with the invention with a mounted vehicle tire.

FIG. 1 shows a vehicle wheel with vehicle pneumatic tires 3 and a rim 1 with a ratio of a maximal height H to a maximal width B of the vehicle pneumatic tire H/B≦0.6. The vehicle pneumatic tire 3 exhibits a an inner layer (not depicted in more detail) which extends over the circumference of the tire and from the left bead region 6 of the vehicle pneumatic tire to the right bead region 6, via which a carcass 4 of a radial construction with, for example, one or two carcass layers is built. In the area of the rolling surface, radially outside the carcass 4, a belt 5 of a known construction, with, for example, two belt layers made of stress supports embedded in unvulcanized rubber—for example, made of steel cord—is deposited. The belt extends over the entire circumference of the tire and extends in an axial direction from one tire shoulder region to the next.

The steel cords run in peripheral direction at an acute angle of 10° to 30°, for example. It is conceivable, radially outside of the belt layers, to coil a belt binding (not depicted) with stress supports—made of nylon, for example—which run essentially in the circumferential direction.

A tread 15 of unvulcanized rubber material, which extends over the circumference of the tire and which reaches from shoulder region to shoulder region is applied radially exterior to the belt or belt bindings in a known manner. Unvulcanized rubber material is applied to the carcass 4 in the side-wall region 9. The side-wall unvulcanized rubber material extends from the shoulder region to the bead region 6.

On both of its axial front ends, the rim 1, fabricated as a one-piece rim, is constructed in one piece with, respectively, a toroidal chamber 10—which is disposed concentrically to the rim—with a radially inward toroidal chamber wall 20; with an axially inward toroidal chamber wall 21; with a radially outward toroidal chamber wall 22; and an axially outward toroidal chamber wall 23. The toroidal chamber wall 23 borders on wheel flange 2, which is oriented radially inward. From the axial exterior toward the toroidal chamber, a ring-shaped slot 24 is constructed axially inward between the wheel flange 2 and the toroidal chamber 20, which is disposed radially farther in. The wheel flange 2 is extended conically from axially inward to axially outward on its side 25 which is oriented radially inward and its front end 26 has an arched construction. An emergency rolling saddle 11 extends on the radially exterior side of the wheel flange with its emergency rolling saddle surface 14 extending over the position of the toroidal chamber 10. Each emergency rolling, saddle surface extends so far radially inward that the belt is covered axially—10% to 30%, for example, 25%—in its axial edge zones from the shoulder.

With its lower side-wall region, the vehicle pneumatic tire 3 encompasses the flange 2, which is oriented radially inward. The curvature of the front end 6 of the flange corresponds with the desired tire contour in the region of the flange.

At the end of the lower side of the side-wall region 16, the bead region 6 is designed with a bead-like enlargement oriented toward the inner side of the tire. The bead is designed with an elastically expandable and elastically contractible core 8, which is embedded in the carcass layer end. In the mounted condition in accordance with FIG. 1, the bead region 6 fills approximately ½ to ⅔ of the toroidal chamber space at the form closure to the axially inner toroidal chamber wall 21 and to radially exterior toroidal chamber wall 22, as well as to axially exterior toroidal chamber wall 23. Radially within the bead, a filler ring 12 is designed radially and with a form closure toward the bead region 6 in the radially outward direction and in the radially inward direction to the radially inner toroidal chamber wall 20, which extends in axial direction from the toroidal chamber wall 10 over the entire axial extension of the bead region 6 through the toroidal opening and in an axially outward direction. The filler ring 12 is constructed in a cylindrically expanded manner over the entire axial extension region of the toroidal chamber and, therefore, of the bead 6 on its radially exterior shell and is designed in a conically expanded manner axially exterior to the toroidal chamber, parallel to the radially inner side of the wheel flange 25. In the embodiment from FIG. 1, the filler ring 12 extends in an axial direction up to the axial position of the front side 26 of the wheel flange. In accordance with the embodiment in FIG. 1 and during form closure, the bead stands radially outward; axially inward; and axially outward to the closed toroidal chamber walls 22, 23, 21; and, because of the radial form closure to the filler ring 12—designed in its part in the radial form closure to the closed toroidal chamber wall 20—, extends toward the toroidal chamber wall 20 in the radial form closure. Since the bead comes into form closure contact over its entire surface with the toroidal chamber of a one-piece design or with the filler ring 12, and since, on its pair, the filler ring is designed within the toroidal chamber with its entire surface to come into contact with the toroidal chamber walls or to the bead, the toroidal chamber is completely filled by the bead and filler ring. Moreover, the lower side-wall region 16 is in complete contact with the radially inner conical wheel flange side 25 and with the correspondingly designed conically exterior shell of the filler ring 12, even in the axial extension region of the wheel flange.

The complete form closure of the bead to the rim secures the seat of the tire on the rim during driving.

In the region of the front end 26 of the flange 2 of the rim, the tire side-wall is subject only to initial stress.

During the deposition of a circumferential element of the tire on the road surface, the resulting normal forces F operate between the pneumatic vehicle tire and the road surface. With the absorption of these forces, a resulting force $F_A$ operates on the side walls 9 of the tire, which operates essentially in axial direction and arches the side-wall a little more. Because of the selected initial tension between the front end 26 and the tire, the tire still lies against the front end 26 in this normal type of burdened state with the reduction of initial tension. When taking a curve, the initial tension between the front end 26 and the tire side-wall is increased in the region of the particularly heavily loaded curve exterior; this is due to the forces that were introduced. The vehicle pneumatic tire 3 is thus braced by the flange on the side which is especially loaded. Safe handling is guaranteed.

In the event of impact effects on the tire, the more strongly resulting forces $F_A$ operate on the tire side-walls. The tire side-walls bulge further axially outward during cushioning of the impact effects. The side-wall region which is available for the flexible arching of the side-wall extends in the process from the shoulder region of the tread all the way over the entire arched area of the front end 26. In the event of forceful impacts the tire side-wall 9 lifts in the region of the front end 26 and forms a slot between the front end 26 and the tire side-wall.

Even impacts that affect the tire very forcefully can be absorbed safely with a minimal surface strain of the curved side-wall surfaces, due to the large radius of curvature R and the very long, arc length of the tire side-wall—for the curvature—between the tire shoulder and the cylindrical rim surface, which is available.

The emergency rolling saddle 11 which extends axially inward also extends over the entire circumferential region of the tire. In the event of a sudden loss of interior pressure, the tire is supported with its tread region with an emergency rolling saddle 11, which is oriented in the axle direction with an angle of inclination of 0° to 10° and which is provided on both sides with an essentially cylindrical or an inwardly oriented, slightly conically expanded surface. Premature destruction and detachment of the tire are avoided.

It is also conceivable to cover the radially exterior surface of the emergency rolling surfaces with additional support material. The additional support material is constructed of hard synthetic material, rubber, or synthetic material foam, which is insensitive to impacts for cushioning and it provides good gliding characteristics for emergency rolling.

Figure 2A:
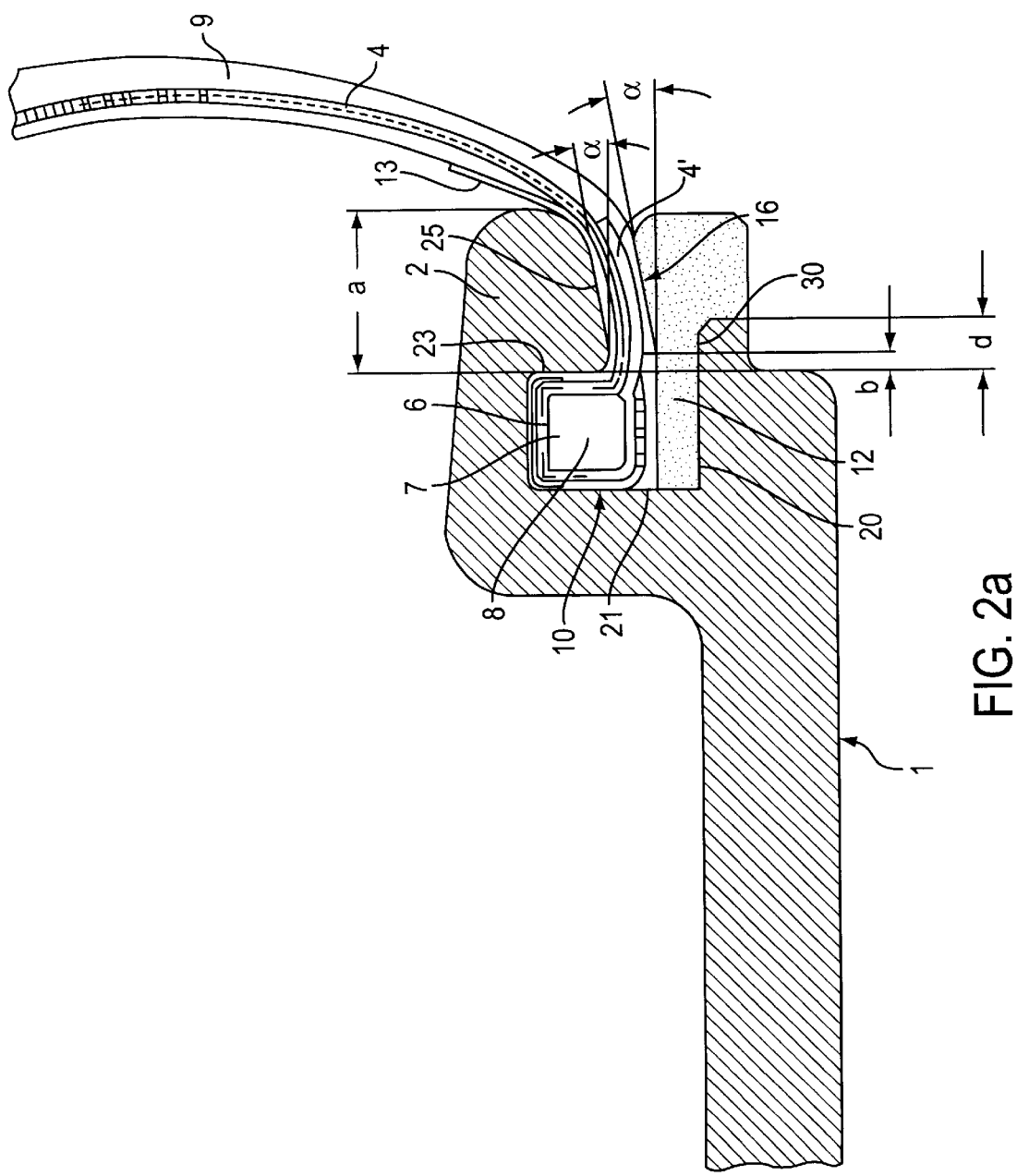
FIG. 2a is an enlarged depiction of an outer edge region of the rim.

FIG. 2a shows a magnified detail depiction of the outer edge region of the rim from FIG. 1. In FIG. 2a it can be seen that the inner side 25 of the wheel flange expands conically, beginning with the toroidal chamber wall 23 incorporating an angle α toward the wheel axis radially outward up to the curved front end 26 of the wheel flange 2. The radially exterior shell of the filler ring 12 is of conical design, beginning with the toroidal chamber wall 21 over the entire axial extension region of the toroidal chamber up to the toroidal chamber wall 23, and in an axial extension of the toroidal chamber up to an axial distance b to the toroidal chamber wall 23. Beginning with a circumference in interval b to the toroidal chamber wall 23, the radially exterior shell of the filler ring 12 is conically expanded axially outward in an axial direction outward, parallel to the inner side 25 of the wheel flange, and, thus also is at an angle α to the wheel axis. The filler ring, as does the wheel flange, extends over an interval a from the toroidal chamber wall 23 axially outward. The filler ring 12 is mounted onto a cylindrical bearing surface 30 of the rim in a such a manner that it is axially displaceable. The bearing surface 30 forms the radially inner toroidal chamber wall 20 within the toroidal chamber. The bearing surface 30 extends axially outward up to a distance d from the toroidal chamber wall 23. Axially outside the distance d, the filler ring is of an enlarged design radially inward to a shoulder and lies adjacent to a correspondingly constructed shoulder of the rim. The intervals a, b, d are selected such that a is larger than d, and that d is larger than b. The angle α lies between 2° and 20°. In the embodiment depicted, the angle is approximately 10°. In this way, the bead with its enlarged design 7 and the adjoining lower side-wall region 16 between the inner wheel flange surface 25 and the filler ring are forced to encompass the wheel flange, through which the staying of the tire in the rim is additionally secured.

The filler ring is made of rubber or of an elastic synthetic material with a self-locking surface. It is also conceivable to manufacture the filler ring from a non-elastic synthetic material or from metal. To the extent that it is necessary in a particular case, it is also possible to also axially fix the filler rim in a mounted condition with its shoulder to the corresponding shoulder of the rim, for example, by screwing it in.

Figure 2B:
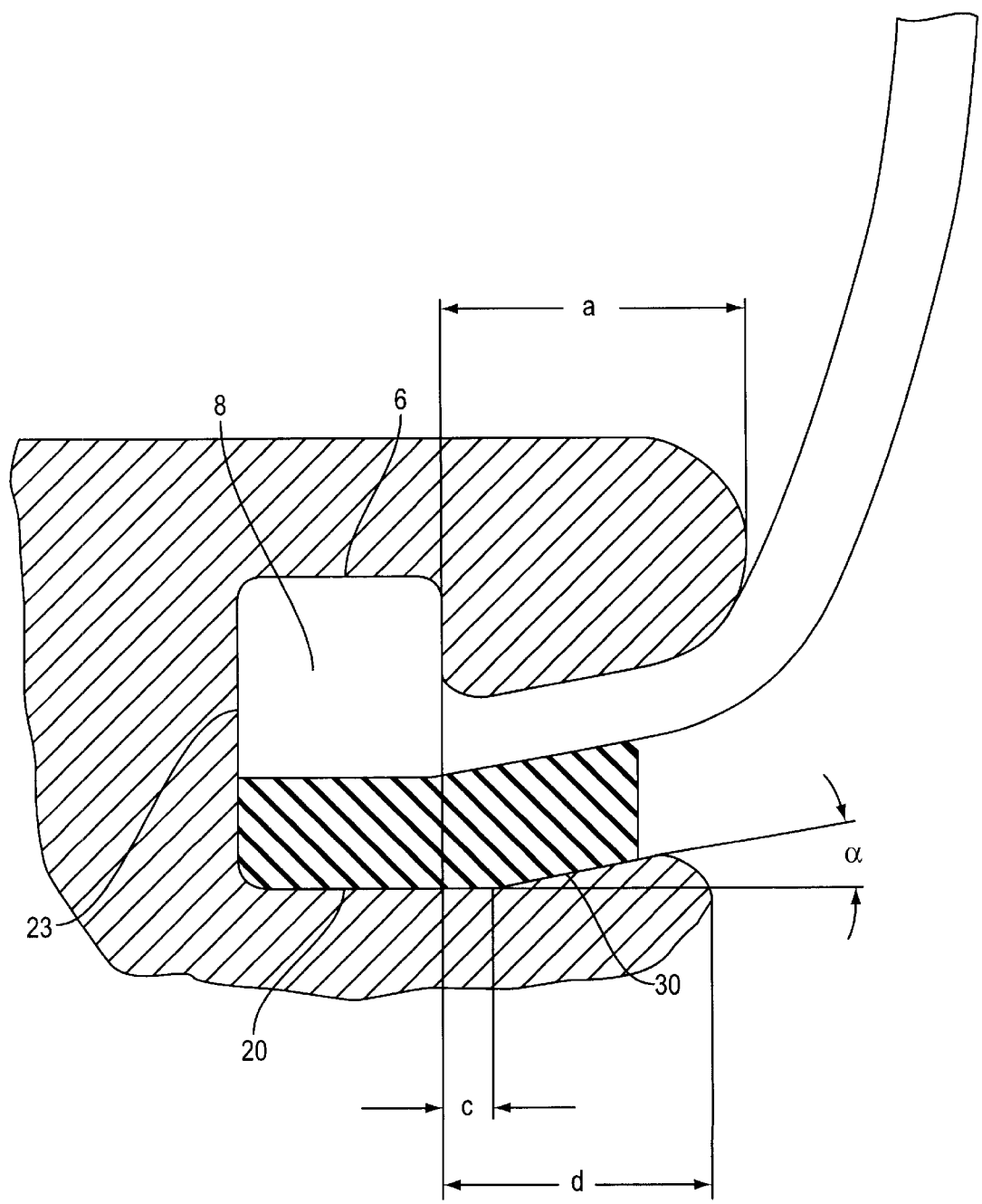
FIG. 2b shows a feature of a filler ring of the invention.
Figure 2C:
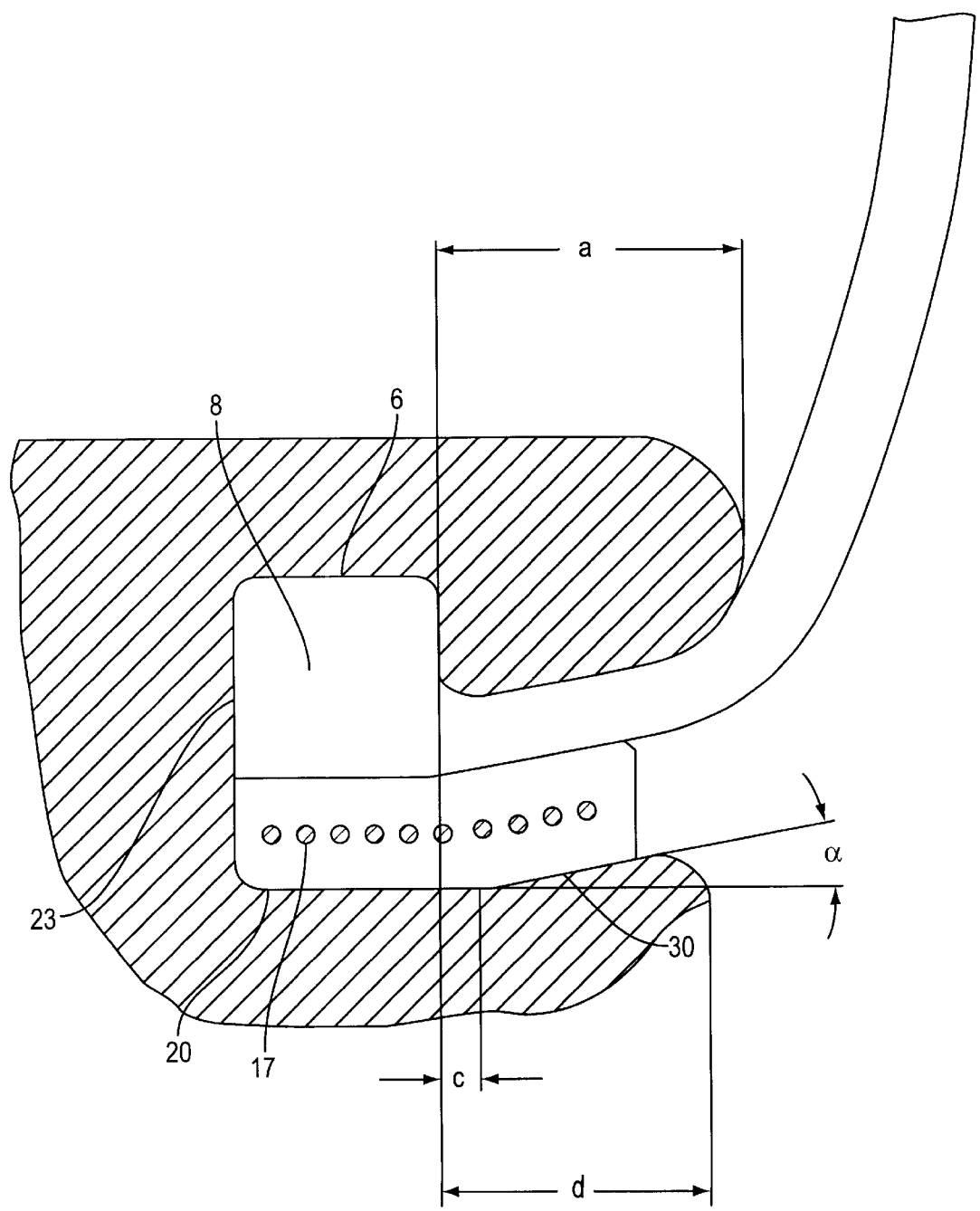
FIG. 2c shows another feature of a filler ring of the invention.

Alternative embodiments of the filler ring 12 are depicted in FIGS. 2b and 2c. The bearing surface 30 extends axially to an interval c—which is less than or equal to interval a—, from the toroidal chamber side-wall 23 outward. The radially exterior shell of the filler ring is also constructed such that it runs conically at the angle of inclination α beginning with the axial position of the toroidal chamber side-wall 23. The radially interior shell of the filler ring is, as is the correspondingly constructed bearing surface 30, of a conically expanded design of an angle α, starting with the axial position in interval c of the toroidal chamber side-wall 23. Interval c is smaller than interval a. By virtue of this conical design, the elastic filler ring is additionally secured in its mounted position by an axial form closure.

A filler ring is depicted in FIG. 2c as in FIG. 2b; this filler ring, however, has stress supports 17 running essentially in the circumferential direction, which are embedded in elastic rubber or synthetic material. The stress supports lend the filler ring additional support on the bearing surface 30. The stress supports 17 can be numerous, adjacent, coiled, tensile stress supports disposed in the circumferential direction. In another embodiment, one or more adjacently disposed stress supports arc coiled around the axis of the filler ring from one axial end to the other axial end of the filler ring in a continuous, helical manner. The distances between the adjacent coilings are equidistant. To the extent that an even securer fixing of the filler ring on the bearing surface 30 is useful, the distances can vary. The stress supports arc monofilaments or multifilaments made of steel. In another embodiment the stress supports are cloth monofilaments or multifilaments. It is also conceivable to make the stress supports 17 from strips of cloth. The reinforcement of the filler ring 12 through stress supports in the described manner is also possible in the embodiment in FIG. 2a.

Figure 3B:
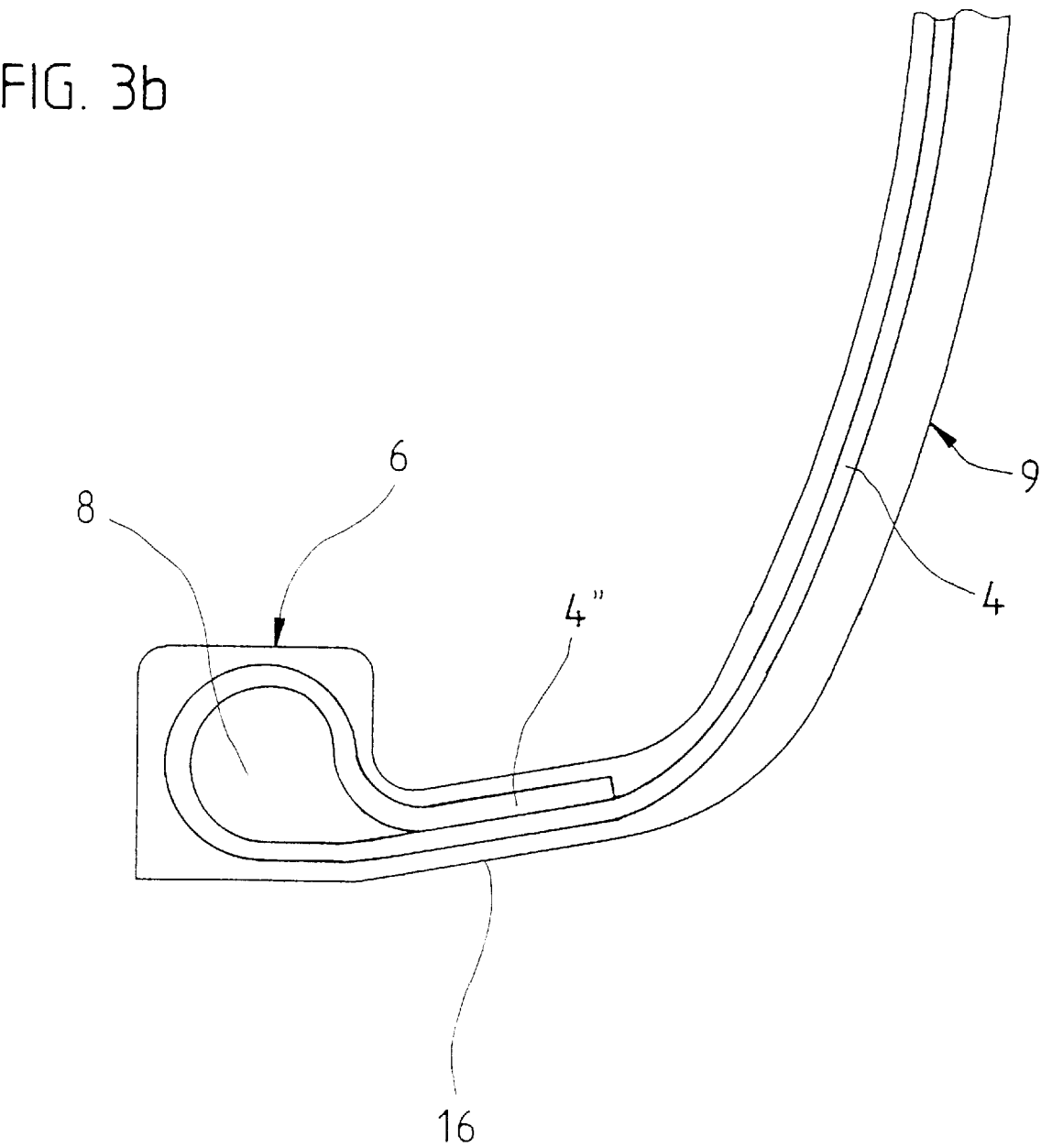
FIG. 3b shows another feature of the bead core embedded in a tire carcass.

As is depicted in FIGS. 1, 2, and 3a, the bead core 8 is stayed from the interior to the exterior by embedding the core 8 in the carcass 4 by wrapping the carcass 4 around the core, or, as is depicted in the embodiment of FIG. 3b, from the exterior to the interior. The carcass 4 is wrapped tightly around the core 8 and the wrapping 4' is, as with the wrapping 4" in the other embodiment, in direct contact with the main part of the carcass following the core 8. The core 8 has a droplet-shape and tapers to the point of contact between the wrapping and the main part of the carcass. For the construction of the core 8, an elastic rubber material with a Shore A hardness of 80 to 100, preferably 85 to 90—in the embodiment of FIG. 1 a Shore A hardness of 87 was used—is chosen, which exhibits an elastic expansibility in the circumferential direction of the core from 5% to 30%, for standard tire dimensions from 10% to 20%, and an elastic contractibility of 1% to 5%, for standard tire dimensions from 2.5% to 3.5%.

The core is manufactured by extrusion through injection molding or other comparable techniques which are known.

It is also conceivable to construct the bead without a core, whereby in this embodiment which is not depicted, the rubber material of the bead is chosen such that the bead exhibits the named expanding and contracting characteristics in the circumferential direction.

To the extent that the wear between the wheel flange and the lower side-wall is undesirably great, it is possible, as is depicted by way of example in FIGS. 1 and 2a, to make an additional strip 13 of wear-resistant material—for example, from wear-resistant rubber or synthetic material—between the wheel flange, and the bead. The wear-resistant strip can extend all the way into the toroidal chamber and can cover the bead in the toroidal chamber.

Figure 4B:
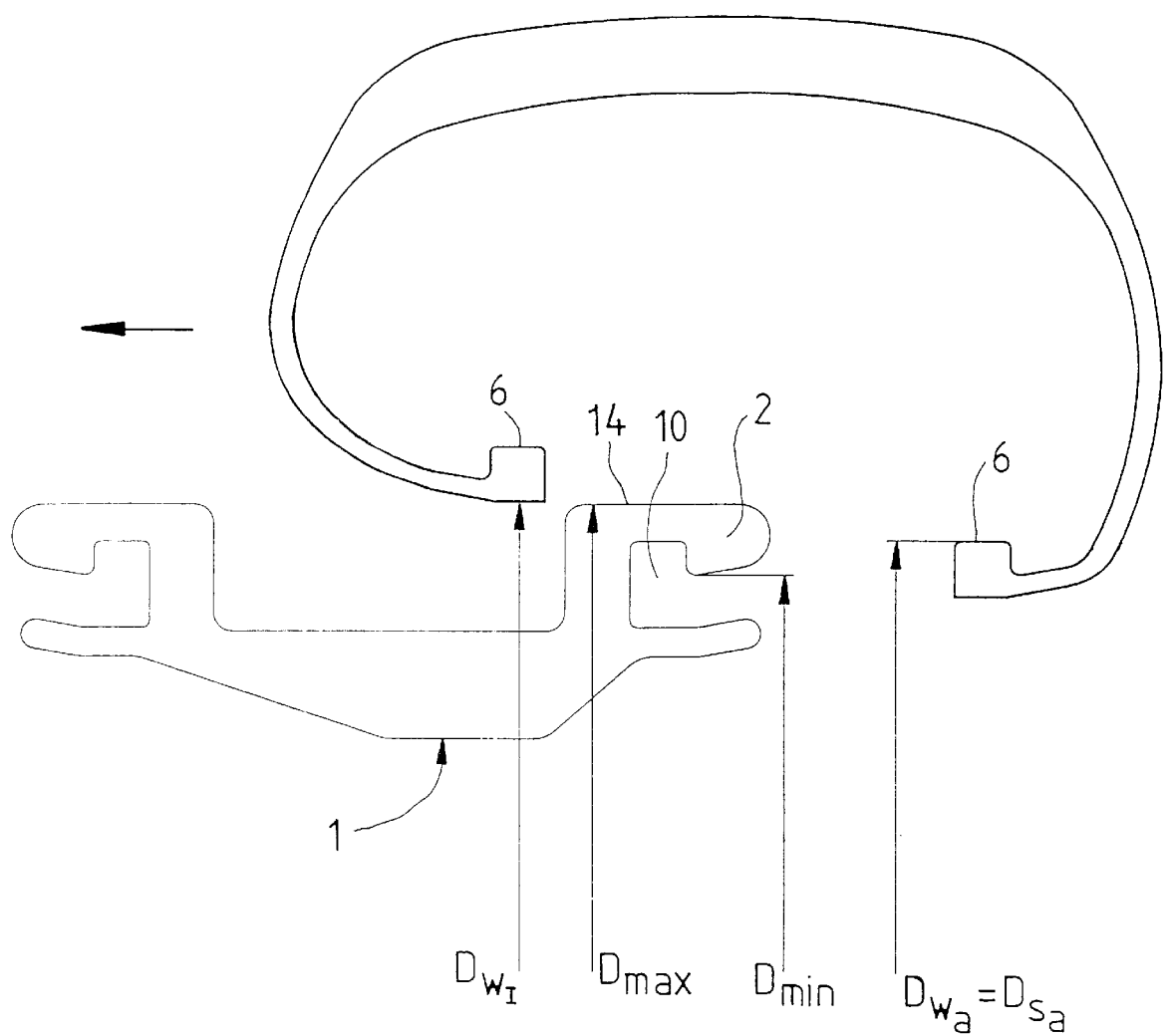

The mounting of the tire on the rim is described below with the aid of the schematic depictions of FIGS. 4a to 4e. The emergency rolling surfaces 14 has a maximal outer diameter Dmax; the two wheel flanges provide a minimal inner diameter Dmin. The tire bead in FIG. 4a is in a state in which it is not expanded and not contracted. Its outer diameter Dwa corresponds to the diameter of the radially exterior toroidal chamber wall 22 and, thus, to the outer diameter of the bead Dsa in its seating position in the toroidal chamber. Its inner diameter Dwi corresponds to the diameter of the radially exterior shell of the filler ring 12 in the toroidal chamber and, thus, to the inner diameter of the bead Dsi in its seating position in the toroidal chamber. The core with a thickness d—for example, d=10 mm in the radial direction—in radial position of the half, radial thickness has a medium core diameter Dwk through the tire axis, which corresponds to the medium core diameter Dsk in the seating position of the bead in the toroidal chamber. Dmax is greater than Dsa, Dsa is greater than Dsk, Dsk is greater than Dmin, and Dmin is greater than Dsi.

Figure 4D:
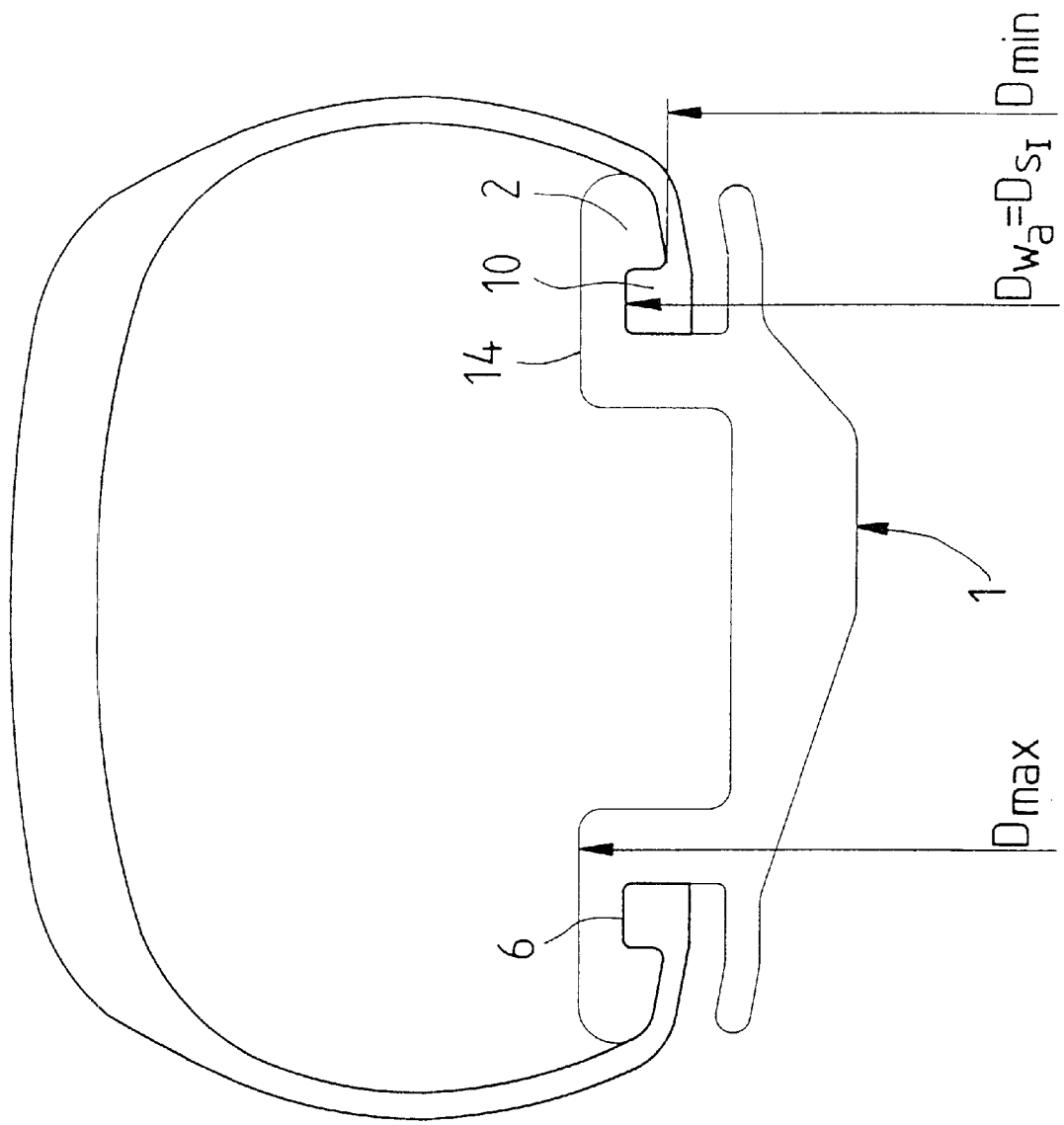
Figure 4E:
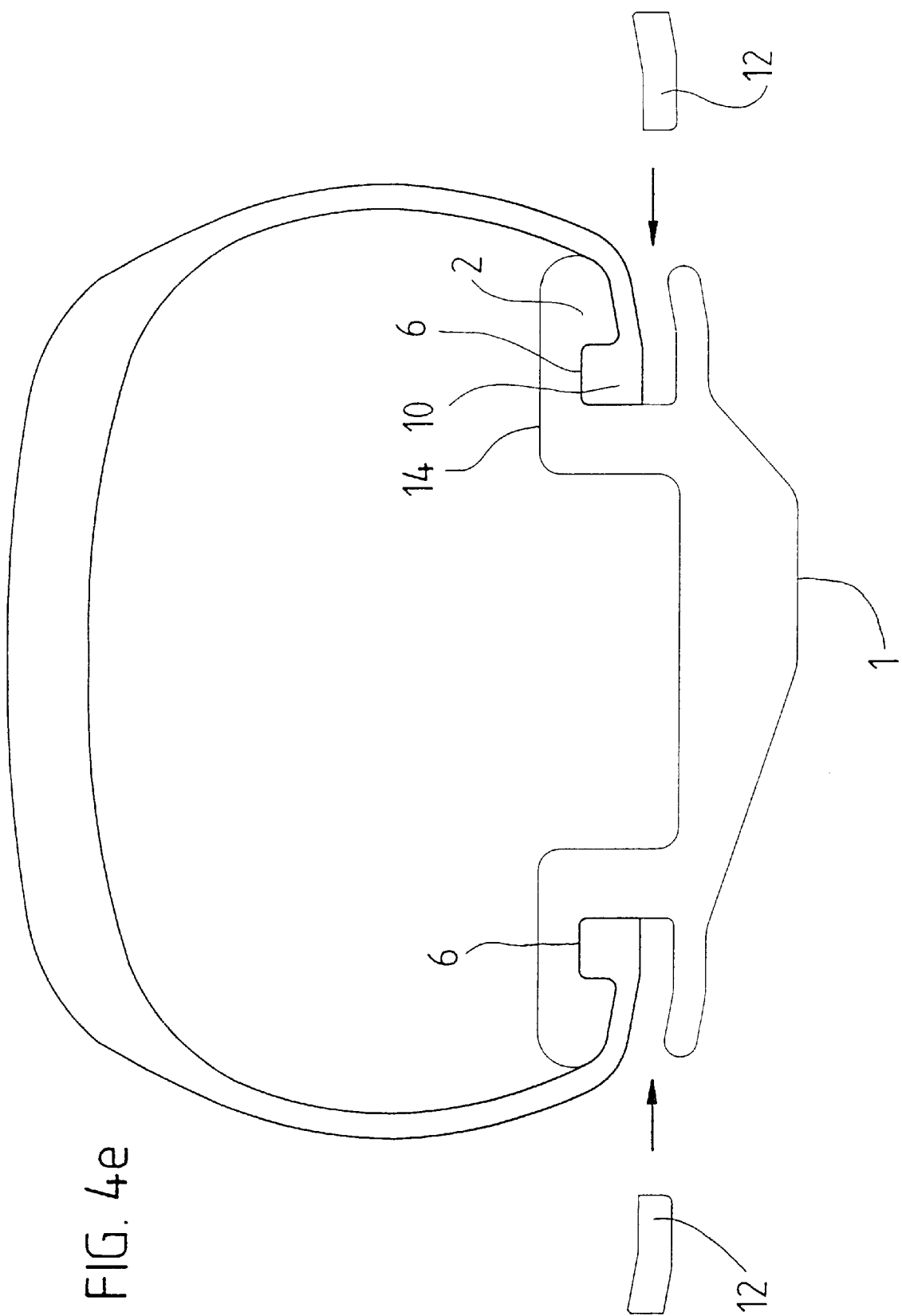
Figure 4F:
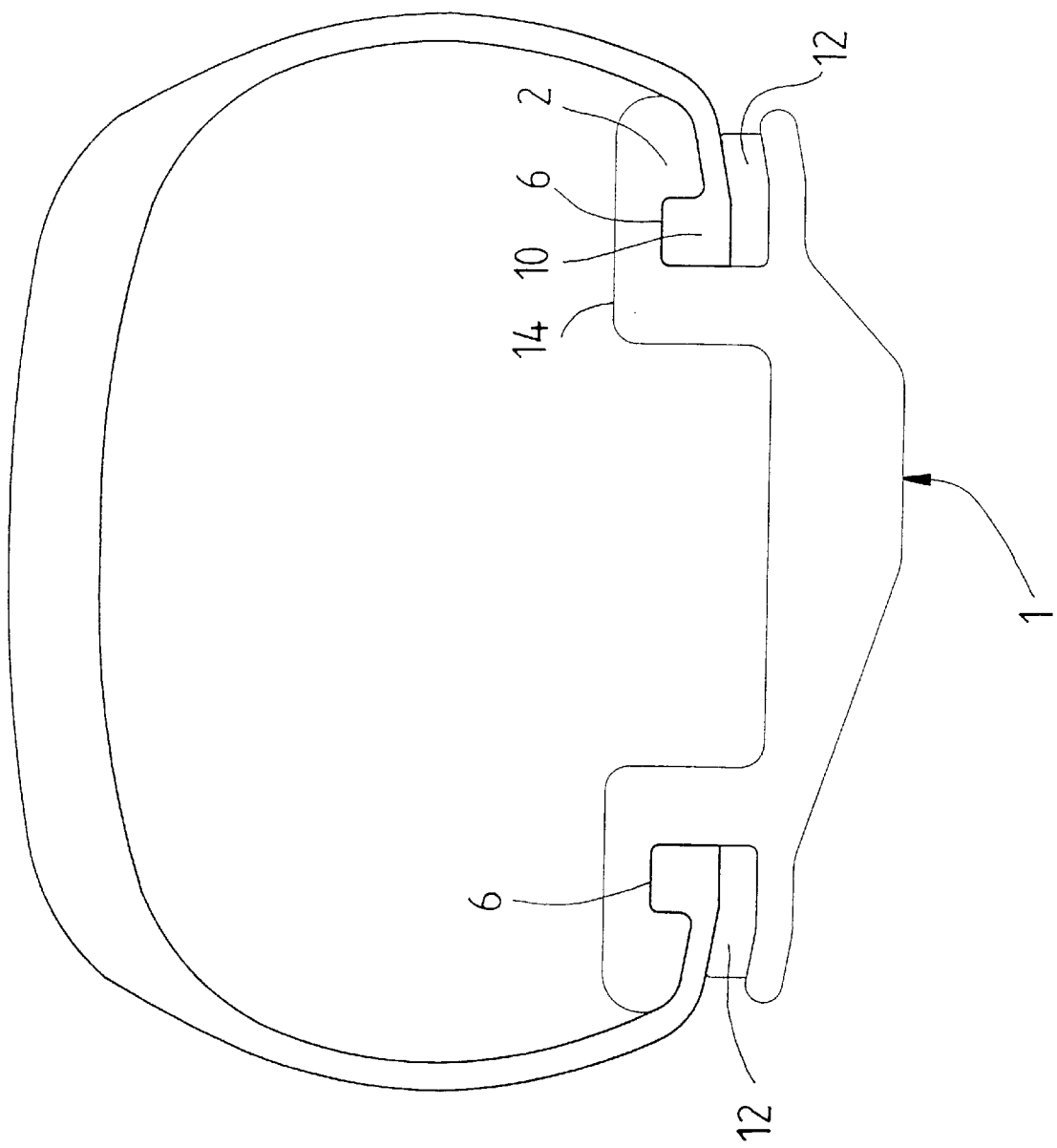

For mounting, the tire 3 is concentrically introduced axially from the right to the wheel rim onto the wheel rim in the figures. The left bead is expanded opposing the elastic restoring forces of the bead in circumferential direction far enough that the inner diameter Dwi of the bead is greater than the maximum outer diameter Dmax of the emergency rolling surface. Thereafter, as depicted in FIG. 4b, the tire 3 is moved further concentrically to the wheel rim axially to the wheel rim, whereby the left bead is displaced axially over the wheel rim while maintaining its expanded state with play to the emergency rolling surface 14. As soon as the left bead has reached a position on the left side axially outside the left wheel flange, the bead is readjusted again in its circumferential length using the elastic restoring forces enough so that it again assumes the unexpanded and uncontracted state. In this state, Dwi again corresponds to Dsi, Dwa to Dsa again, and Dwk likewise corresponds to the medium diameter Dsk of the core in its seating position in the toroidal chamber. As shown by the arrows in FIG. 4c, both beads are now contracted against the elastic restoring forces in their circumferential length far enough so that outer diameter Dwa of the bead is smaller than the minimum wheel flange diameter Dmin. In this state, the beads are introduced axially into the respective toroidal chamber with play to the wheel flange. Using the elastic restoring forces, the beads are again adjusted back into their circumferential lengths to such an extent that they again assume the unexpanded and uncontracted state. In this state, Dwi corresponds again to Dsi, Dwa to Dsa again, and Dwk again corresponds to the medium diameter Dsk of the core in its seating position in the toroidal chamber. The beads sit unexpanded and uncontracted in the toroidal chamber. This state is depicted in FIG. 4d. As illustrated in FIG. 4e, a filler ring 12 is now introduced from the axial exterior between a lower side wall area 16 of the tire and a bearing surface 30 far enough so that the toroidal chamber is completely filled up by the bead and the filler ring. The complete form closure between a single-piece toroidal chamber and the bead is produced.

For dismounting, correspondingly, the filler ring, is first extracted axially from the outside. Thereafter, the beads are contracted far enough so that they can be extracted from the toroidal chamber with play to the wheel flange. After the readjustment of the circumferential length, a bead is expanded enough so that it can be pulled from the wheel rim axially, with play to the emergency rolling surface.

In order to mount, rather than to axially displace, the tire, it is also feasible to turn it 90° first and then to expand it, and to displace it in the expanded state in the radial direction onto the wheel rim, in order to turn it back 90° again, so that both beads are located axially outside the wheel rim. The rest of the mounting procedure follows as described above.

In one embodiment, the diameter Dmax is about 1.2 times greater than the inner diameter Dsi of the bead in the seating position in the toroidal chamber, for example, and the minimum wheel flange diameter is about 1.025 smaller than the outer diameter Dsa of the bead in the seating position in the toroidal chamber. For the rubber material of the bead, a rubber material is chosen with an expansibility and with a contractibility, which should allow an expansion and contraction of the bead in the circumferential direction, such that the bead can be moved axially over the emergency rolling surface 14 and into the toroidal chamber with play. For example, a known rubber material is used which enables a circumferential expansion of the bead to 25% and a circumferential contraction to 2.7%.

The emergency rolling surfaces can also be constructed with a larger or smaller maximum outer diameter Dmax, corresponding to the emergency rolling characteristics of a tire which are to be adjusted individually. The maximum diameter Dmax of the emergency rolling surfaces is thereby optimally greater in standard tires to a factor of about 1.1 to 1.2 than the inner ring diameter Dsi of the bead core in the mounted state of the vehicle wheel. In special cases, however, it can also be of a factor 1.05 and 1.3 times greater than the inner ring diameter Dsi of the bead core in the mounted state of the vehicle wheel. Respectively, a rubber material with an expansibility and a contractibility is chosen as the rubber material of the bead; the expansibility and contractibility allow an expansion and contraction of the bead in circumferential direction, such that the bead can be moved axially with play over the emergency rolling surface 14 and into the toroidal chamber. Accordingly, the bead, which is unexpanded and uncontracted in the mounted state of the vehicle wheel, is constructed, such that it exhibits an expansibility between 10% and 20% and a contractibility of 2.5% to 3.5% in standard tires and in the special cases, an expansibility between 5% and 30% and a contractibility between 1% and 5%.

It is also conceivable to insert a filler ring by spraying thermo-setting plastic material axially from outside through the opening of the toroidal chamber after the introduction of the bead into the toroidal chamber.

It is also feasible to construct an emergency rolling saddle on the radially exterior shell, the emergency rolling surface of which extends over the entire axial middle area of the wheel rim. This can, for example, be constructed over the entire axial belt width of the tire.

List of Reference Names

1. Wheel rim
2. Wheel flange
3. Vehicle pneumatic tire
4. Carcass
5. Belt
6. Bead area
7. Enlargement
8. Core
9. Side wall
10. Toroidal chamber
11. Emergency rolling saddle
12. Filler ring
13. Non-abrasive strip
14. Emergency rolling saddle surface
15. Rolling surface
16. Lower side wall area
17. Stress supports
20. Toroidal chamber wall
21. Toroidal chamber wall
22. Toroidal chamber wall
23. Toroidal chamber wall
24. Ring opening
25. Inner side of the wheel flange
26. Front end of the wheel flange
30. Bearing surface

What is claimed is:

1. A vehicle wheel having a one-piece wheel rim and a tubeless pneumatic tire suitable for emergency rolling, comprising:
    an emergency rolling surface provided on a radially exterior shell of the rim;
    an elastic bead provided on the pneumatic tire to fasten the pneumatic tire to the rim, the bead having an enlargement on each side wall of the pneumatic tire and having a variable circumferential length;
    a one-piece toroidal chamber provided at each axial front end of the rim and including a plurality of toroidal chamber walls, one chamber wall being a radially interior chamber wall, another chamber wall being a radially exterior chamber wall, another chamber wall being axially inward to a center portion of the rim, and another chamber wall being axially exterior to an exterior of the rim, the plurality of toroidal chamber walls that are radially inward, radially outward and axially inward to the center of the rim are closed and the toroidal chamber wall axially exterior to an exterior of the rim is closed in a radially exterior area so as to define a wheel flange directed radially inward and has an opening in a radially interior area; and
    a filler ring being radially secured in each toroidal chamber on the radially interior chamber wall; and wherein each side wall of the tire extends inwardly from the axially exterior wall through the opening in the toroidal chamber wall provided axially exterior; and the bead is embedded in the toroidal chamber radially outside the filler ring and is in form-closure contact with the radially exterior wall, the axially interior wall, and the axially exterior closed toroidal chamber wall, so that the bead is connected in the toroidal chamber to the radially exterior wall, to the axial exterior wall, to the axial interior wall and to the form closure via the filler ring; and wherein the bead lies on the filler ring across the axial extent of the filler ring in the toroidal chamber and the bead and the filler ring completely fill the toroidal chamber.

2. Vehicle wheel in accordance with claim 1, wherein an axial position of the emergency rolling surface in the radially exterior shell at least partially corresponds to the axial position of the bead fastened in the wheel rim.

3. Vehicle wheel in accordance with claim 1, wherein in an area of the rolling surface of the tire between two shoulder regions a belt axially extends from one shoulder region to the other and the emergency rolling surface is an emergency rolling surface on each axial side area of the radially exterior shell of the wheel rim, and wherein each emergency rolling surface extends axially inward so that 10% to 30% in an axial width of the belt is covered in an axial edge zone of the belt from the shoulder.

4. Vehicle wheel in accordance with claim 1, wherein a rubber core is integrated in the bead, whereby the rubber core has a Shore A hardness in the range from 80 to 100.

5. Vehicle wheel in accordance with claim 4, in which a maximum diameter of the emergency rolling surface is a factor between 1.05 and 1.3 greater than an inner ring diameter of the bead core in the mounted state of the vehicle wheel.

6. Vehicle wheel in accordance with claim 5, wherein the maximum diameter of the emergency rolling surface is a factor between 1.1 and 1.2 greater than the inner ring diameter of the bead core in the mounted state of the vehicle wheel.

7. Vehicle wheel in accordance with claim 4, wherein the bead core has at least one of an expansibility and contractibility of 5% to 3%.

8. Vehicle wheel in accordance with claim 7, wherein the bead core has an expansibility of 5% to 30% and a contractibility of 1% to 5% and wherein the bead core is unexpanded and uncontracted in the mounted state of the vehicle wheel.

9. Vehicle wheel in accordance with claim 8, wherein the bead core has an expansibility of approximately 10% to approximately 20% and a contractability of approximately 2.5% to approximately 3.5% and wherein the bead core is unexpanded and uncontracted in the mounted state of the vehicle wheel.

10. Vehicle wheel in accordance with claim 7, wherein the bead core has at least one of an expansibility and contractability of approximately 10% to approximately 20%.

11. Vehicle wheel in accordance with claim 4, wherein the Shore A hardness is in the range between approximately 85 and approximately 90.

12. Vehicle wheel in accordance with claim 1, wherein the bead is coreless.

13. Vehicle wheel in accordance with claim 1, wherein the filler ring releases/fastens the bead in an axially movable manner, and the radially interior toroidal chamber wall forms over its entire axial extent a bearing surface for axial sliding thereon and for axial pulling out of the filler ring, and the filler ring is provided on its radial interior side with a corresponding bearing surface.

14. Vehicle wheel in accordance with claim 13, wherein the filler ring in the fastening position extends in the toroidal chamber axially outward through the opening.

15. Vehicle wheel in accordance with claim 13, wherein the filler ring is provided with a radially exterior jacket surface in an extension exterior of the toroidal chamber which follows the contour of the tire.

16. Vehicle wheel in accordance with claim 13, wherein the filler ring is provided with a radially exterior shell which is conically extended outside the toroidal chamber.

17. Vehicle wheel in accordance with claim 13, wherein the filler ring is provided with a radially exterior shell which is extended outside the toroidal chamber so that it conforms to the contour of the rim wherein the pneumatic tire is supported interiorly by the wheel rim and exteriorly by the filler ring.

18. Vehicle wheel in accordance with claim 1, wherein the filler ring is provided with a radially exterior shell which is extended cylindrically across the toroidal chamber.

19. Vehicle wheel in accordance with claim 1, wherein the pneumatic tire is fastened with the bead on the wheel rim and lies adjacent to the wheel rim in the lower side wall region.

20. Vehicle wheel in accordance with claim 1, wherein the filler ring includes at least one rubber-coated stress support, wound around the axis of the filler ring in a helical manner, said at least one stress support being one of a textile and steel material formed as one of a monofilament, a multifilament and a woven material.

21. Vehicle wheel in accordance with claim 1, wherein a rubber core is integrated in the bead.

22. A process for mounting a tubeless pneumatic tire provided with an elastic bead, the bead having an enlargement on each side wall of the pneumatic tire and having a variable circumferential length, on a one-piece wheel rim having an emergency rolling surface provided on a radially exterior shell of the rim and a one-piece toroidal chamber provided at each axial front end of the wheel rim, each chamber including a plurality of toroidal chamber walls, one chamber wall being a radially interior chamber wall, another chamber wall being a radially exterior chamber wall, another chamber wall being axially inward to a center portion of the rim, and another chamber wall being axially exterior to an exterior of the rim, the plurality of toroidal chamber walls that are radially inward, radially outward and axially inward to the center of the rim being closed and the toroidal chamber wall axially exterior to an exterior of the rim being closed in a radially exterior area so as to define a wheel flange directed radially inward and having an opening in a radially interior area so as to embed the bead of the tire and a filler ring in the wheel rim toroidal chamber, comprising:

introducing the pneumatic tire through the radially interior opening of the chamber, each side wall of the tire extending inwardly from the axially exterior wall through the opening;

positioning the bead of the pneumatic tire in the respective toroidal chamber; and radially securing the filler ring in each toroidal chamber on the radially interior chamber wall by axial displacement of the filler ring on the radially interior chamber wall, thereby embedding the bead in the toroidal chamber radially outside the filler ring in an axial and radial form closure contact with the filler ring, the radially exterior wall, the axially interior wall, and the axially exterior closed toroidal chamber wall so that the bead is connected in the toroidal chamber to the radially exterior wall, to the axially exterior wall, to the axially interior wall and to the form closure via the filler ring, the bead lying on the filler ring across the axial extent of the filler ring in the toroidal chamber and the bead and the filler ring completely filling the toroidal chamber, so as to fasten the bead in the chamber.

* * * * *